US008612318B1

(12) United States Patent  (10) Patent No.: US 8,612,318 B1
Blowers  (45) Date of Patent: Dec. 17, 2013

(54) PAYROLL TAX SETTLEMENT SERVICES

(76) Inventor: Alden J. Blowers, Incline Village, NV (US)

( * ) Notice: Subject to any disclaimer, the term of this patent is extended or adjusted under 35 U.S.C. 154(b) by 0 days.

(21) Appl. No.: 13/051,868

(22) Filed: Mar. 18, 2011

(51) Int. Cl.
*G06F 17/22* (2006.01)

(52) U.S. Cl.
USPC ............................................................ 705/31

(58) Field of Classification Search
None
See application file for complete search history.

(56) References Cited

U.S. PATENT DOCUMENTS

| | | | |
|---|---|---|---|
| 5,117,356 A | 5/1992 | Marks | |
| 5,987,433 A | 11/1999 | Crapo | |
| 6,401,079 B1 | 6/2002 | Kahn et al. | |
| 6,411,938 B1 | 6/2002 | Gates et al. | |
| 6,606,606 B2 | 8/2003 | Starr | |
| 7,039,898 B2 | 5/2006 | Shah | |
| 7,089,200 B2 | 8/2006 | Bode | |
| 7,305,347 B1 | 12/2007 | Joao | |
| 7,716,094 B1 * | 5/2010 | Sutter et al. | 705/31 |
| 2002/0184148 A1 * | 12/2002 | Kahn et al. | 705/40 |
| 2003/0225638 A1 | 12/2003 | Secola | |
| 2004/0010776 A1 | 1/2004 | Shah | |
| 2004/0015950 A1 | 1/2004 | Dutta et al. | |
| 2004/0111361 A1 | 6/2004 | Griffiths et al. | |
| 2004/0148215 A1 | 7/2004 | Visconti et al. | |
| 2005/0010501 A1 | 1/2005 | Ward | |
| 2006/0021799 A1 | 2/2006 | Hall et al. | |
| 2007/0136156 A1 * | 6/2007 | Seeley et al. | 705/30 |
| 2010/0042518 A1 * | 2/2010 | Handa et al. | 705/30 |
| 2010/0138323 A1 * | 6/2010 | Gowda et al. | 705/30 |

OTHER PUBLICATIONS

Non Final Office Action for U.S. Appl. No. 11/780,633, mailed Sep. 23, 2008.
Non Final Action for U.S. Patent No. 5117356, mailed Dec. 24, 2008.
Final Office Action for U.S. Appl. No. 11/054,993, mailed Jan. 23, 2009, 8 pages.
Non Final Office Action for U.S. Appl. No. 11/780,633, mailed Sep. 23, 2008, 18 pages.
Non Final Office Action for U.S. Appl. No. 10/678,326, mailed Dec. 24, 2008, 11 pages.
Non final Office Action for U.S. Appl. No. 10/678,326, mailed Nov. 15, 2007, 10 pages.
Non final Office Action for U.S. Appl. No. 10/678,326 dated May 12, 2010.
Final Office Action for U.S. Appl. No. 10/678,326 dated Jun. 2, 2008.
Final Office Action for U.S. Appl. No. 10/678,326 dated Aug. 4, 2009.

(Continued)

*Primary Examiner* — Mussa A Shaawat
(74) *Attorney, Agent, or Firm* — Blakely, sokoloff, Taylor & Zafman (57) ABSTRACT

A method and system for payroll tax settlement that receives payroll tax files from a payroll provider system, the payroll tax files including payroll tax transaction data for a plurality of employers and a plurality of tax authorities. The payroll tax settlement system also receives transaction feedback data from a banking network, where the transaction feedback data provides completion and error information on payroll tax transactions between the plurality of employers and at least one tax authority. The system creates a ledger for each employer using the payroll tax transaction data from the payroll tax files and generates a reconciliation report by matching transaction feedback data with each employer and comparing transaction feedback data with the ledgers of the corresponding employer. The system provides the reconciliation report to the payroll provider system.

17 Claims, 3 Drawing Sheets

(56) References Cited

OTHER PUBLICATIONS

Final Office Action for U.S. Appl. No. 11/780,633 dated Apr. 21, 2009.
Non final Office Action for U.S. Appl. No. 11/780,633 dated Sep. 23, 2009.
Final Office Action for U.S. Appl. No. 11/780,633 dated Apr. 19, 2010.
Non final Office Action for U.S. Appl. No. 11/763,348 dated Jul. 7, 2009.
Final Office Action for U.S. Appl. No. 11/763,348 dated Dec. 30, 2009.
Non Final Office Action for U.S. Appl. No. 10/678,326, mailed Oct. 7, 2010, 19 pages.
Non Final Office Action for U.S. Appl. No. 11/780,633, mailed Aug. 26, 2011, 22 pages.
Alexander, Marcus, et al., "Strategic Outsourcing", *Long Range Planning,* vol. 29, No. 1, pp. 116-119, 1996, Copyright 1996 Elsevier Science Ltd.
Cachet Banq, Non-Final Office Action mailed Feb. 14, 2012 for U.S. Appl. No. 10/678,326., 11 pages.
Non Final Office Action mailed Sep. 21, 2012 for U.S. Appl. No. 11/780,633.
Cheney, Glenn, "Making payroll a profit center", *Accounting Technology*; 14(9), S3-S10; retrieved from http://search.proquest.com/docview/214016577.
Needleman, Ted, "Today's payroll apps offer plenty of choices", *Accounting Today*; 17(14), 26-30; retrieved from http://search.proquest.com/docview/234449713.
Piturro, Marlene, "Payroll for Hire", *Accounting Technology,* 14(2), 45-52; retrieved from http://search.proquest.com/docview/214018374.

\* cited by examiner

PAYROLL TAX SETTLEMENT SERVICES

The embodiments of the invention relate to a system for tax settlement services. Specifically, the embodiments of the invention relate to an automated tax settlement service that generates reconciliation reports on a per employer basis.

BACKGROUND

Automated payroll services systems are provided to end users (e.g., businesses and similar organizations) via a vendor (e.g., a 'payroll service provider,' which is a business that sells automated payroll services to their clients who are employers). The employer and/or automated payroll service provider's systems must interact with and use multiple service providers in order to carry out financial transactions related to payroll processing including tax payment processing, tax funding processing, investment of funds, and similar financial transactions.

The processing of payroll by an employer and payroll service provider includes taxes (local, state and federal) that are paid to the appropriate tax authority by using automated clearing house (ACH) transactions to transfer funds. Banks return feedback on the success of the transactions, but provide no reconcilement services related to tax settlement. Payroll service providers are unable to easily reconcile tax transactions on a per employer basis based on transaction feedback data provided by banks, because the transaction feedback data is an aggregate of transactions performed by the banks. Further, banks cannot provide per employer transaction feedback data because they do not process payroll tax payment documents that define the relationship between the transactions and the employers. As a result, payroll service providers must manually match transaction feedback data and payroll tax data to reconcile these activities.

BRIEF DESCRIPTION OF THE DRAWINGS

The embodiments of the invention are illustrated by way of example and not by way of limitation in the figures of the accompanying drawings in which like references indicate similar elements. It should be noted that references to "an" or "one" embodiment of the invention in this disclosure are not necessarily to the same embodiment, and they mean at least one.

DETAILED DESCRIPTION

Figure 1:
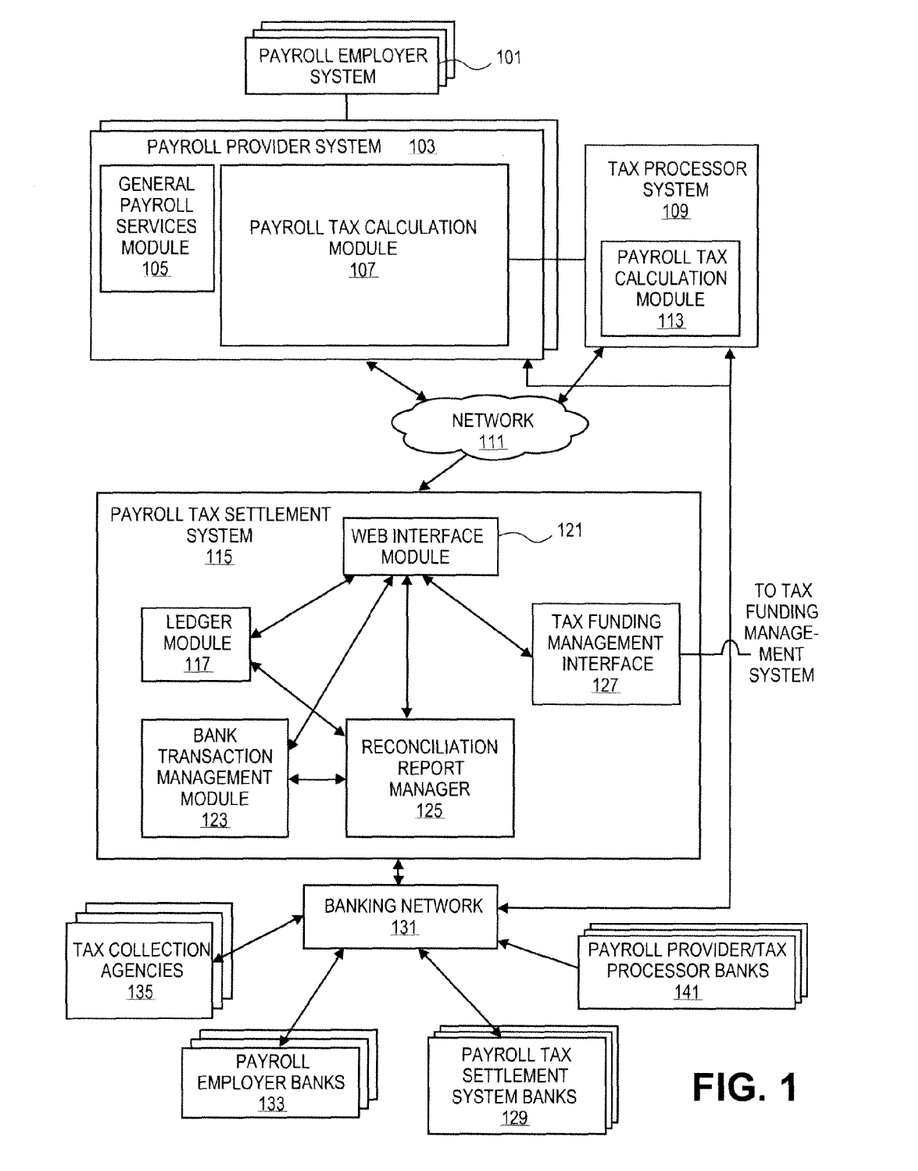
FIG. 1 is a diagram of one embodiment of a network including a payroll tax settlement system.

FIG. 1 is a diagram of one embodiment of a payroll tax settlement system. In one embodiment, a payroll tax settlement service is provided by a payroll tax settlement system 115, which services a set of payroll provider systems 103 and ultimately a set of payroll employer systems 101. A 'set,' as used herein, refers to any positive whole number of items including one item. A payroll provider system 103 is a system of a payroll service provider, which as used herein can refer to any one of a software company providing payroll software, a proprietary or in-house payroll system of an employer, payroll software system provided as a service, a payroll service separate from the employer or similar payroll provider system. For sake of convenience and clarity, the embodiments described herein are in reference to a payroll provider system 103 that is a payroll software service separate from an employer's payroll system 101. One skilled in the art would understand that the principles and structures described herein are applicable to the other types of payroll provider systems.

The payroll tax settlement system 115 can include any number of computing devices including dedicated servers, desktops, laptops and similar computing devices. The payroll tax settlement system 115 can communicate with the set of payroll provider systems 103 over a network 111. In other embodiments, the payroll tax settlement system 115 can communicate or receive payroll and tax data from a payroll provider system 103 through manual exchange and input of documents or a similar data exchange or any combination thereof. The payroll provider system 103 receives payroll data from the payroll employer systems 101. The payroll employer systems 101 can be in communication with the payroll provider system 103 over a network or can exchange data by manual, any other direct means or combinations thereof.

The payroll employer system 101 can be any type of computing device or set of computing devices that execute any payroll software. The payroll software can generate and output payroll data for the employees of the employer that operates the respective payroll employer system 101. The payroll data can define wages and salaries and similar information for a given time span. In some embodiments, this payroll data can include retirement account (e.g., 401(k) account) data, garnishment data, worker's compensation data and similar payroll related data.

The payroll provider system 103 can include a general payroll service module 105 and a payroll tax collection module 107. The payroll provider system 103 can be executed by any computing device or set of computing devices including dedicated servers, desktop computers, laptop computers and similar computing devices. The general payroll services module 105 processes payroll employer system 101 data and generates standard payroll data for the employers and returns the payroll data to the employers. The general payroll module 105 can also execute or initiate transactions to affect the transfer of funds related to the payroll by moving funds from employer banks to the banks of the employees or generating checks. The general payroll services module 105 can communicate and coordinate with the payroll tax calculation module 107.

The payroll tax calculation module 107 generates the local (e.g., county and municipal), state and federal tax data for each employer and each of their employees and generates a set of financial transactions (e.g., ACH transactions) to be executed by employer banks 133 in order to transfer the appropriate funds from the employer banks 133 to the tax collection agencies 135. These transfers can include yearly and quarterly tax withholding, social security and medical and similar withholding and payroll taxes. In this process, the payroll tax collection module 107 can generate a set of tax data files, tax funding files and tax disbursement files.

The tax data files, tax funding files and tax disbursement files detail the transactions and parties involved in the transactions. In one example embodiment, these files can include tax processor identification information, payroll processor identification information, employer identification information, tax processor bank identification information, payroll processor bank identification information, employer bank identification information, payroll instance identification information, payroll liability identification information specific payments or transactions to pay tax liabilities for a particular payroll instance, this can be on a per bank account basis), employer draft information (i.e., the details of transactions such as ACH transactions to obtain funds to cover tax liabilities from employer banks and similar transactions, this can be on a per bank account basis), tax payment information (i.e., the details of transactions such as ACH transactions to transfer funds to tax authorities to cover tax liabilities for employers, this can be on a per bank account basis), bank account balance information, tax code information, and similar information. This information can be provided in a single formatted file or any combination of separate files.

In one embodiment, the payroll provider system 103 works in conjunction with a tax processor system. In this embodiment, the payroll provider system 103 does not process all payroll tax matters and these payroll tax matters are sent to a tax processor system 109 to be processed. In this embodiment, the tax processor system 109 includes a payroll tax calculation module 113 to perform some or all of the actions set forth above in regard to the payroll tax calculation module 107 of the payroll provider system 103. For sake of clarity and convenience, the embodiments herein are described primarily in relation to the embodiment where the payroll provider system 103 performs the payroll tax processing. One skilled in the art would understand that these functions or a subset thereof could be performed by a separate tax processor system 109.

The payroll provider system 103 or tax processor system 109 can provide the payroll tax files (e.g., the tax data files, tax funding files and tax disbursement files) to a payroll tax settlement system 115 over the network 111. Network 111 can be any type of network including a local area network, a wide area network, such as the Internet or a similar network. The network 111 can include any number of wired or wireless connections and any number of intermediate computing or networking devices. In other embodiments, these data files can be transferred through physical media including data storage devices and similar media.

The payroll tax settlement system 115 includes a web interface module 121, a ledger module 117, a bank transaction management module 123, a reconciliation report manager 125 and optionally a tax funding management interface 127. The payroll tax settlement system 115 can be implemented in a set of computing devices including dedicated servers, desktop computers, laptop computers, work stations and similar computing devices. The components of the payroll tax settlement system 115 can be distributed across any number of computing devices.

In one embodiment, the payroll tax files are received from the payroll provider system 103 through a web interface module 121. In other embodiments, the payroll tax settlement system 115 receives the payroll tax files through other electronic transmission mechanisms, through physical media transfer or through manual transmission of the data. The web interface module 121 can be any type of web server or similar type of web based interface that provides a set of web pages through which a payroll provider can access and upload payroll tax files as well as receive and manage reconciliation reports. In one embodiment, the web interface module 121 can pass received payroll tax files to the ledger module 117 and tax funding management interface 127. The web interface module can sort or parse the incoming payroll tax files to identify the tax funding management related files and forward those files to the tax funding management interface 127.

The tax funding management interface 127 is an optional aspect of the payroll tax settlement system 115 whereby the payroll tax settlement system 115 assists in the processing of tax funding management for payroll provider or employer, which is handled by an external tax funding management system component that are separate and discrete applications that can be remote from the tax settlement system. The tax funding management interface 127 communicates with the external tax funding management system and provides copies of the received tax funding management related files to be processed by the tax funding management system. These tax files and other payroll tax files are also provided to the ledger module 117, which sorts these files per employer and generates a ledger of the balances for each employer for each state, local and federal tax agency to which the individual employers and their respective employees are paying taxes or transferring withholdings. The ledger module 117 creates a separate ledger or set of ledgers for each employer and maintains these ledgers as new tax data files are received from the payroll provider system. In some embodiments, these ledgers track non-tax related payroll data that affects balances in accounts through which tax transactions are executed.

The payroll tax settlement system 115 also includes a bank transaction management module 123. The bank transaction management module 123 receives transaction feedback data from the banking network 131 related to the tax transactions initiated by the payroll provider systems 103. The banking network 131 and ultimately the employer banks 133, payroll provider or tax processor banks 141 and tax collection agencies and the tax settlement system banks 129 process the tax transactions that transfer the funds from the employer banks 133 to the tax collection agencies and from the tax funding management accounts to the tax collection agencies and generate notices of the successful execution of these transactions and/or any failures in these transactions as well as the details of these transactions that are sent to the bank transaction management module 123. In some embodiments, the banking accounts through which these tax transactions are processed also include other payroll related funds. In these embodiments, transactions related to other payroll transactions including garnishment, retirement accounts (e.g., 401(k) accounts), worker's compensation and similar payroll transaction are monitored and the results of these transactions are provided in the transaction feedback data.

Reconciliation report manager 125 matches and compares the transaction feedback data received through the bank transaction management module 123 with the ledgers generated by the ledger module 117. The transactions are sorted and matched with the payroll tax transaction information in the ledgers to verify the accuracy of each of the completed transactions and to ensure that the ledgers are accurate. Any errors or inconsistencies are also tracked. These comparisons or reconciliation of the ledgers and the transaction feedback data are utilized to generate reconciliation reports on a per employer basis by the reconciliation report manager 125. These reconciliation reports are then provided back to the payroll provider system 103 through the web interface module 121, email or similar process. In one embodiment, the reconciliation report or similar feedback is only provided when an error or similar issue is identified. The reconciliation reports can simply notices (individual or aggregated) of out of balance transactions or similar detected errors.

In one embodiment, the reconciliation process includes a number of checks. The reconciliation process audits each payroll tax data file electronically to ensure receipt of balanced data. The total tax liabilities being accrued by each individual payroll tax authority and by each employer, must equal and be offset by the funding requirements of each individual employer. The individual employer funding or collection file must balance to a receivable file due and payable from each individual employer. The individual employer payroll tax disbursements file detailing electronic deposits or manual checks issued to individual tax authority must balance to the amounts of payroll tax liabilities previously posted to the individual employer ledgers as due and payable. The payroll tax data files, the employer funding or collection files and the payroll tax disbursement files (electronic or manual) are posted as forwarded or received to the individual employer ledgers. These ledgers must balance to the bank statements received. Adjustment files must contain debits and credits to correct individual employer payroll tax ledgers and are balanced to the bank statements. The reconciliation process checks the transaction feedback data (including any transaction affecting accounts used for tax transactions) and incoming tax files to determine whether each of these requirements is met and logs those that are not met.

The tax collection agencies 135, employer banks 133, and tax settlement system banks 129 communicate with each other and with the payroll tax settlement system 115 through a banking network 131 or similar network. The banking network 131 can be a private or specialized network for processing banking transactions such as automated clearing house (ACH) transactions and similar banking transactions. In other embodiments, the payroll tax settlement system 115 can be part of an open or hybrid network including aspects that are connected over a wide area network (WAN) 121 such as the Internet. The tax collection agencies 135 can be the Internal Revenue Service of the United States, state and local tax collection authorities and similar tax collection agencies. Employer banks 133 can be any type of banking institution that manages the banking accounts of the employers. Similarly, the tax settlement system bank 129 can be any banking institution or similar authority that manages the accounts of the payroll tax settlement system 115 and through which tax funding can be managed.

Figure 2:
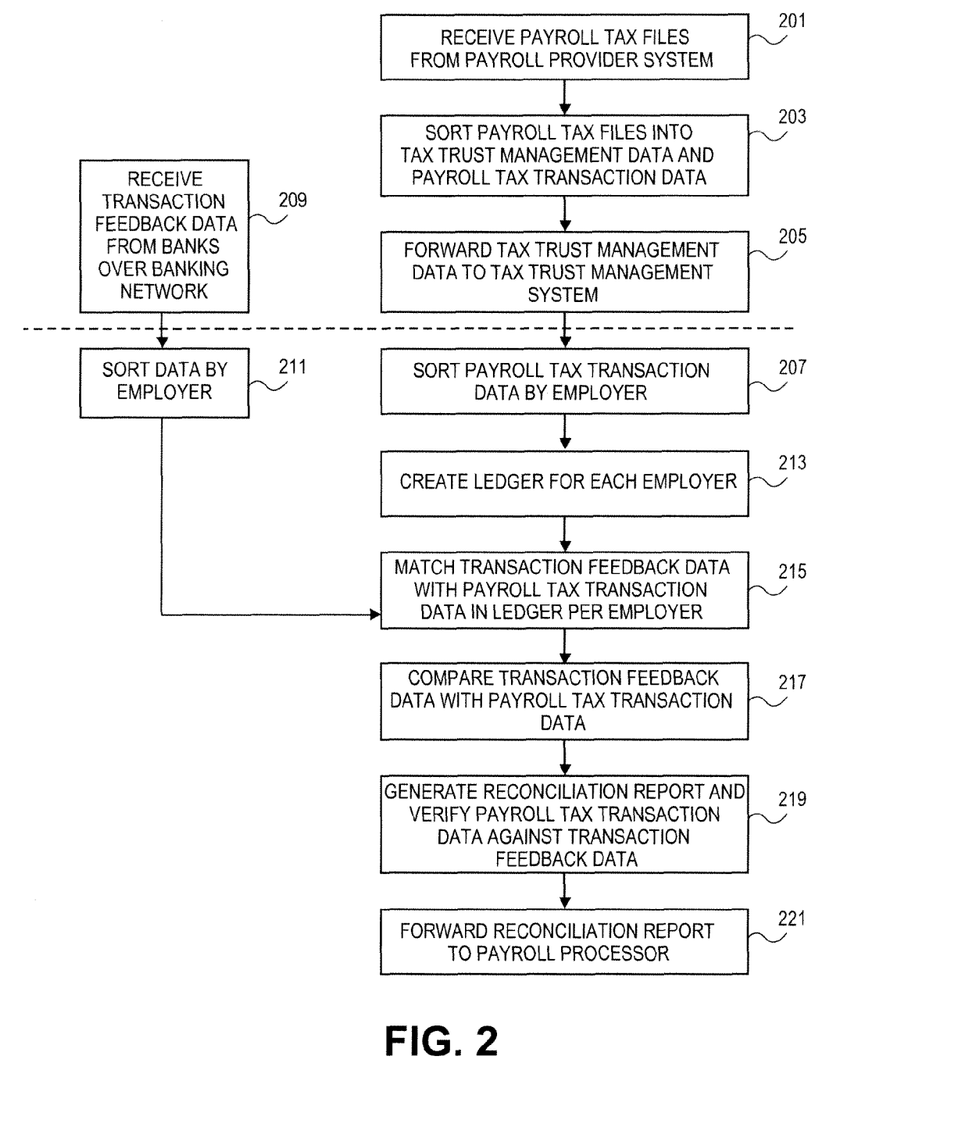
FIG. 2 is a flowchart of one embodiment of the tax settlement process.

FIG. 2 is flowchart of one embodiment of the payroll tax settlement process performed by the payroll tax settlement system. The process can be initiated by the payroll tax processing system receiving the payroll tax files (e.g., tax data files, tax funding files and tax disbursement files) from the payroll provider system (Block 201). The payroll tax files can include the tax data files, tax funding files and tax disbursement files. These files can be in any format or form and can be generated by any type of payroll processing service system executed by any payroll provider system. The contents of the payroll tax files can be sorted into tax funding management data and payroll tax transaction data (Block 203). Tax funding management data can be forwarded to the tax funding management system through the tax funding management interface (Block 205). The use and incorporation of the tax funding management is optional. The remaining payroll tax transaction data can be further sorted to segregate the data by employer and/or employee (Block 207). In some embodiments, other payroll related data including garnishment data, retirement account data (e.g., 401(k) account data), and worker's compensation data are also received to determine how the balances of bank accounts associate with tax transactions are affected.

Asynchronously, the payroll tax system can receive transaction data or transaction feedback data from the banks of the employer, tax settlement system banks (e.g., through the FRB), payroll provider system and tax processing system banks and from the tax agencies through the banking network or through a similar communication system (Block 209). The transaction feedback data can also be sorted by an employer grouped by the employer, or similarly processed (Block 211).

The payroll tax data files can be used to create a ledger for each employer (Block 213). The ledgers can have any form or format and any number of ledgers can be generated for each employer. For example, separate ledgers can be generated for each tax agency. The ledgers include payroll tax data, such that overall balances for each tax agency and similar balance information is maintained. These ledgers can be updated over time in increments or continuously as new payroll tax data is received by the system. If balances are affected by non-tax transactions, then these transactions can also be tracked (e.g., garnishment, retirement account, worker's compensation and similar transactions).

In one embodiment, the function of the employer ledgers is to create a complete balanced accounting history of payroll tax processing for all individual employers payroll tax liabilities, the collection of those payroll tax liabilities, and then the payment of those payment tax liabilities to the payroll tax authority involved. This is accomplished for thousands of employers and thousands (over eight thousand) of taxing authorities. All of these transactions are ledgered and balanced to the bank account(s) of the corresponding employer. Employer ledgers maintain balanced data for the following activities: cash in bank; receivables from employers federal withholding tax liabilities (FWT); Federal Insurance Contributions Act liabilities (FICA); federal unemployment insurance liabilities (FUI), state withholding tax liabilities (SWT by state); state unemployment insurance liabilities (SUI by state) and local taxes (city, county, occupational, educational and other) as required by taxing authorities. In some embodiments, these employer ledgers also include non-payroll tax transaction data affecting account balances such as garnishment, retirement account, worker's compensation and similar transaction data.

At defined intervals or in response to receipt of new payroll tax transaction data or payroll transaction feedback data, the transaction feedback data can be matched with payroll tax transaction data and any non-tax payroll transaction data affecting relevant account balances in ledgers on a per employer basis (Block 215). The transaction feedback data and payroll tax data can be compared to determine whether there is a match in between respective entries. Any or all the properties of these transactions such as the amount and timing of the transactions. Based on these comparisons, a reconciliation report can be generated (Block 217).

The reconciliation report provides verification for those payroll tax transactions and other non-tax transactions affecting relevant account balances in the payroll fax files and ledgers that match their corresponding transaction feedback indicating that the transaction was processed and carried through as expected and as recorded in the payroll tax transaction data. Inconsistencies or errors or unmatched transactions can also be included in the reconciliation report. These inconsistencies can then be resolved by the payroll processor. These reconciliation reports are generated on a per employer basis, further facilitating the speed and ease by which inconsistencies and errors can be corrected or the cause determined.

The reconciliation reports can be forwarded to the payroll processor upon completion or on an intermittent basis (Block 219). These reconciliation reports can be automatically provided to the payroll processor through direct messaging such as through an email or can be made available through the web-based interface. The reconciliation report can have any format or form. The detail provided in the reconciliation report can vary and can include transaction identification information, transaction details (e.g., time of transaction, amount of transaction), employer identification, payroll provider system identification, tax processor system identification and similar information. These reports can be an accumulation of separate errors or notifications or they can be generated and issued for each separate error or notification.

Figure 3:
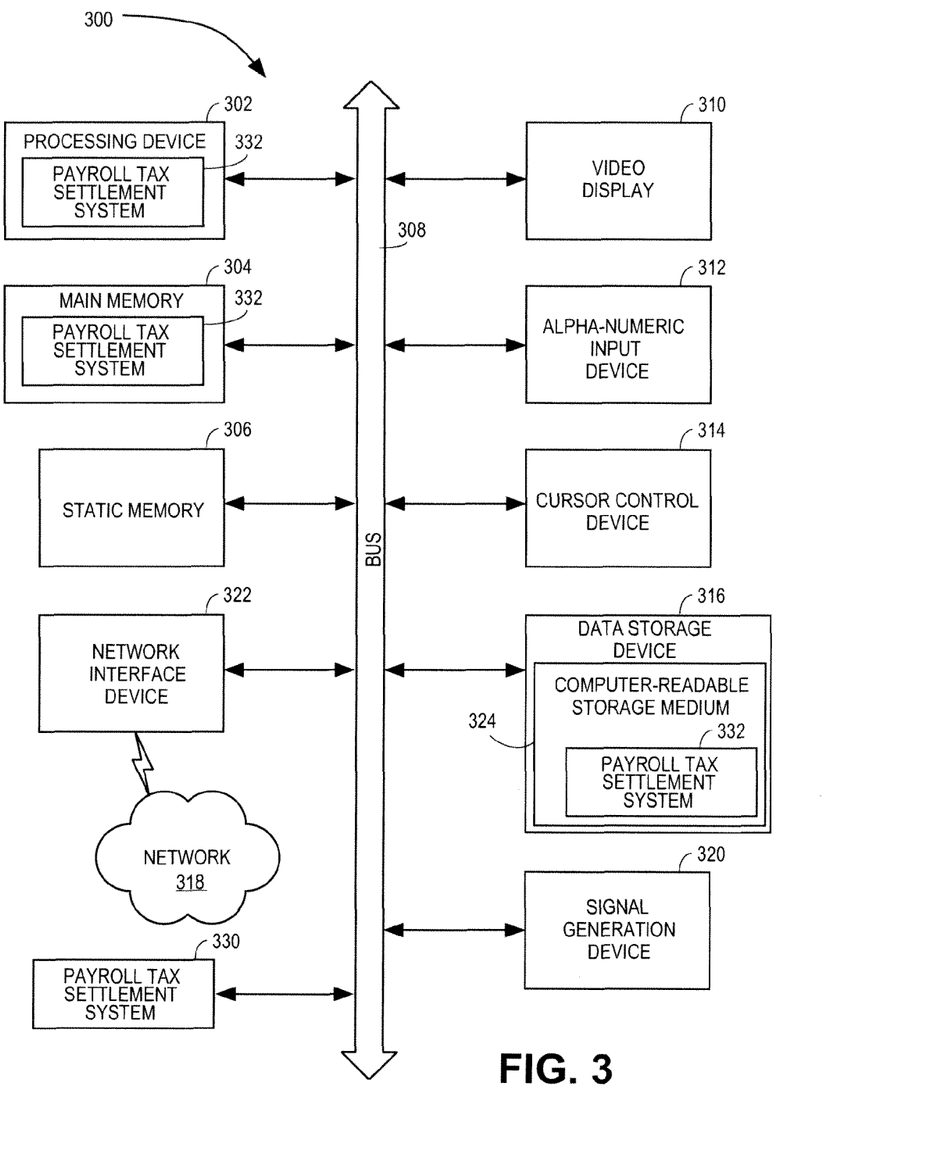
FIG. 3 is a diagram of one embodiment of a payroll tax settlement system.

FIG. 3 is a diagram of one embodiment of a payroll tax settlement or a system implementing a payroll tax settlement service. Within the computer system 300 is a set of instructions for causing the computer or other machine to perform any one or more of the methodologies discussed herein. In alternative embodiments, the computer system 300 may be connected (e.g., networked) to other machines in a LAN, an intranet, an extranet, or the Internet. The computer system 300 can operate in the capacity of a server or a client machine (e.g., a client computer executing a code patcher module and a server computer executing a computer module) in a client-server network environment, or as a peer machine in a peer-to-peer (or distributed) network environment. The machine may be a personal computer (PC), a tablet PC, a console device or set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computer is illustrated, the term "computer" shall also be taken to include any collection of computers or other machines that individually or jointly execute a set (or multiple sets) of instructions to perform any one or more of the methodologies discussed herein.

The exemplary computer system 300 includes a processing device 302, a main memory 304 (e.g., read-only memory (ROM), flash memory, dynamic random access memory (DRAM) such as synchronous DRAM (SDRAM) or Rambus DRAM (RDRAM), etc.), a static memory 306 (e.g., flash memory, static random access memory (SRAM), etc.), and a secondary memory 316 (e.g., a data storage device in the form of a drive unit, which can include fixed or removable computer-readable storage medium), which communicate with each other via a bus 308.

The processing device 302 represents one or more general-purpose processing devices such as a microprocessor, central processing unit, or the like. More particularly, the processing device 302 can be a complex instruction set computing (CISC) microprocessor, reduced instruction set computing (RISC) microprocessor, very long instruction word (VLIW) microprocessor, processor implementing other instruction sets, or processors implementing a combination of instruction sets. In another embodiment, the processing device 402 can also be one or more special-purpose processing devices such as an application specific integrated circuit (ASIC), a field programmable gate array (FPGA), a digital signal processor (DSP), network processor, or the like. The processing device 302 is configured to execute the payroll tax settlement system 332 for performing the operations and steps discussed herein.

The computer system 300 can further include a network interface device 322. The computer system 300 also can include a video display unit 310 (e.g., a liquid crystal display (LCD) or a cathode ray tube (CRT)) connected to the computer system through a graphics port and graphics chipset, an alphanumeric input device 312 (e.g., a keyboard), a cursor control device 314 (e.g., a mouse), and a signal generation device 320 (e.g., a speaker).

The secondary memory 316 can include a machine-readable storage medium (or more specifically a computer-readable storage medium) 324 on which is stored one or more sets of instructions (e.g., the payroll tax settlement system 332) embodying any one or more of the methodologies or functions described herein. The payroll tax settlement system 332 can also reside, completely or at least partially, within the main memory 304 and within the processing device 302 during execution thereof by the computer system 300, the main memory 304 and the processing device 302 also constituting machine-readable storage media. The payroll tax settlement system 332 can further be transmitted or received over a network 318 via the network interface device 322.

The machine-readable storage medium 324 can also be used to store the payroll tax settlement system 332 persistently. While the machine-readable storage medium 324 is shown in an exemplary embodiment to be a single medium, the term "machine-readable storage medium" and also "computer-readable storage medium" should be taken to include a single medium or multiple media (e.g., a centralized or distributed database, and/or associated caches and servers) that store the one or more sets of instructions. The terms "machine-readable storage medium" and "computer-readable storage medium" shall also be taken to include any medium that is capable of storing or encoding a set of instructions for execution by the machine and that cause the machine to perform any one or more of the methodologies of the present invention. The terms "machine-readable storage medium" and "computer-readable storage medium" shall accordingly be taken to include, but not be limited to, solid-state memories, and optical and magnetic media.

In one embodiment, the payroll tax settlement system 330 can be implemented as a separate hardware component such as application specific integrated circuits (ASICs). The payroll tax settlement system 330 can communicate with the other components over the bus 308.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "creating," "sending," "generating," or the like, refer to the actions and processes of a computer system, or similar electronic computing device that manipulates and transforms data represented as physical (electronic) quantities within the computer system's registers and memories into other data similarly represented as physical quantities within the computer system memories, registers or other such information storage, transmission or display devices.

The present invention also relates to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, Flash memory devices including universal serial bus (USB) storage devices (e.g., USB key devices) or any type of media suitable for storing electronic instructions, each of which may be coupled to a computer system bus.

The algorithms and displays presented herein are not inherently related to any particular computer or other apparatus. Various general purpose systems may be used with programs in accordance with the teachings herein or it may prove convenient to construct more specialized apparatus to perform the required method steps. The required structure for a variety of these systems has been described in the description above. In addition, the present invention is not described with reference to any particular programming language. It will be appreciated that a variety of programming languages may be used to implement the teachings of the invention as described herein. Further, while software and hardware embodiments have described herein to illustrate the range of possible implementations, those skilled in the art would understand that any combination of these techniques can be utilized, such that the invention would not have an entirely hardware or software implementation, for example, any of the functions or algorithms described herein could be implemented in microcoded hardware components.

Thus, a method and apparatus for payroll tax settlement has been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving payroll tax files from a payroll provider system, the payroll tax files including payroll tax transaction data for a plurality of employers;
receiving transaction feedback data from a banking network the transaction feedback data providing completion and error information on payroll tax transactions between the plurality of employers and at least one tax authority;
creating a ledger for each employer in the plurality of employers using the payroll tax transaction data from the payroll tax files; and
executing by a computer-implemented payroll tax processing system a reconciliation process by matching transaction feedback data with each employer and comparing transaction feedback data with the ledgers of the corresponding employer.

2. The method of claim 1, further comprising:
generating a reconciliation report for errors found in the reconciliation process; and
providing the reconciliation report to the payroll provider system or a payroll employer system.

3. The method of claim 2, wherein the reconciliation report is provided to the payroll provider system through a web based user interface.

4. The method of claim 1, wherein comparing transaction data further comprises:

identifying tax funding transactions in the payroll tax files; and
forwarding the tax funding transactions to a tax funding management system.

5. A payroll tax settlement system comprising:
a memory to store data of the payroll tax settlement system; and
a processor coupled to the memory, the processor configured to execute a ledger management module to generate a ledger per employer from received payroll tax files from a payroll provider system, a bank transaction management module communicatively coupled to the ledger management module, the bank transaction module to receive transaction feedback data from a bank related to a tax transaction of an employer, and a reconciliation report manager to compare the ledger of each employer to the transaction feedback data and to match each transaction in the transaction feedback data with an employer and to verify an accuracy of the payroll tax file for each employer.

6. The payroll tax settlement system of claim 5, wherein the processor is further configured to execute a tax funding management interface to forward tax funding transactions to a tax funding management system to manage a tax funding for a corresponding employer.

7. The payroll tax settlement system of claim 5, wherein the reconciliation report manager generates a reconciliation report including at least one error found by the reconciliation report manager.

8. The payroll tax settlement system of claim 7, wherein the processor is further configured to execute a web interface module to provide and display the reconciliation report to a payroll employer system or a payroll provider system.

9. The payroll tax settlement system of claim 8, wherein the web interface module receives the payroll tax files from the payroll processor.

10. A non-transitory machine-readable medium having instructions stored therein, which when executed cause the machine to perform a set of operations comprising:
receiving payroll tax files from a payroll provider system, the payroll tax files including payroll tax transaction data for a plurality of employers;
receiving transaction feedback data from a banking network the transaction feedback data providing bank transaction completion and bank transaction error information on payroll tax transactions between the banking accounts of each of the plurality of employers and at least one tax authority;
creating a ledger for each employer in the plurality of employers using the payroll tax transaction data from the payroll tax files; and
executing a reconciliation process by matching transaction feedback data with each employer and comparing transaction feedback data with the ledgers of the corresponding employer.

11. The non-transitory machine-readable medium of claim 10, having a further set of instructions stored therein, which when executed cause the machine to perform a further set of operations comprising:
generating a reconciliation report for errors found in the reconciliation process; and
providing the reconciliation report to the payroll provider system or a payroll employer system.

12. The non-transitory machine-readable medium of claim 11, wherein the reconciliation report is provided to the payroll provider system through a web based user interface.

13. The non-transitory machine-readable medium of claim 10, having a further set of instructions stored therein, which when executed cause the machine to perform a further set of operations comprising:
- identifying tax funding transactions in the payroll tax files; and
- forwarding the tax funding transactions to a tax funding management system.

14. A system comprising:
- means for receiving payroll tax files from a payroll provider system, the payroll tax files including payroll tax transaction data for a plurality of employers;
- means for receiving transaction feedback data from a banking network the transaction feedback data providing completion and error information on payroll tax transactions between the plurality of employers and at least one tax authority;
- means for creating a ledger for each employer in the plurality of employers using the payroll tax transaction data from the payroll tax files; and
- means for executing a reconciliation process by matching transaction feedback data with each employer and comparing transaction feedback data with the ledgers of the corresponding employer.

15. The system of claim 14, further comprising:
- means for generating a reconciliation report for errors found in the reconciliation process; and
- means for providing the reconciliation report to the payroll provider system or a payroll employer system.

16. The system of claim 15, wherein the reconciliation report is provided to the payroll provider system through a web based user interface.

17. The method of claim 14, wherein the means for comparing transaction data further comprises:
- means for identifying tax funding transactions in the payroll tax files; and
- means for forwarding the tax funding transactions to a tax funding management system.

* * * * *

UNITED STATES PATENT AND TRADEMARK OFFICE
CERTIFICATE OF CORRECTION

PATENT NO.        : 8,612,318 B1
APPLICATION NO.   : 13/051868
DATED             : December 17, 2013
INVENTOR(S)       : Alden J. Blowers

Page 1 of 1

It is certified that error appears in the above-identified patent and that said Letters Patent is hereby corrected as shown below:

In the Claims,

Column 10, Claim 6, line 25, please delete "fora" and insert --for a--.

Signed and Sealed this
Third Day of November, 2015

Michelle K. Lee
*Director of the United States Patent and Trademark Office*